United States Patent [19]
Fujii

[11] Patent Number: 5,088,298
[45] Date of Patent: Feb. 18, 1992

[54] APPARATUS FOR CONTROLLING COMPRESSOR OF AUTOMOBILE AIR-CONDITIONER

[75] Inventor: Kazuo Fujii, Konan, Japan

[73] Assignee: Diesel Kiki Co., Ltd., Tokyo, Japan

[21] Appl. No.: 539,744

[22] Filed: Jun. 18, 1990

[30] Foreign Application Priority Data

Jun. 22, 1989 [JP] Japan .................................. 1-159919

[51] Int. Cl.⁵ .............................................. F25B 49/00
[52] U.S. Cl. ...................................... 62/228.5; 62/158
[58] Field of Search ............... 62/228.1, 228.4, 228.5, 62/231, 157, 158; 236/1 EA

[56] References Cited

U.S. PATENT DOCUMENTS 4,270,361 6/1981 La Barge ........................... 62/158
4,538,422 9/1985 Mount et al. ................. 62/228.5 X

*Primary Examiner*—Harry B. Tanner
*Attorney, Agent, or Firm*—Wenderoth, Lind & Ponack

[57] ABSTRACT

In an apparatus for controlling a variable displacement compressor incorporated in an automobile air-conditioner, the displacement of the compressor is varied with a change in the target cooling temperature. The change rate of the target cooling temperature thus changed is limited to such an extent that a sudden change in displacement of the compressor is prevented to maintain the drivability of an automobile and to change the cooling power of the evaporator gently, thereby keeping a pleasant feeling during the temperature regulating operation. The change rate of the target cooling temperature can be selected from a plurality of predetermined values to meet a current controlling condition so that the reliability of the air-conditioner is improved.

2 Claims, 5 Drawing Sheets

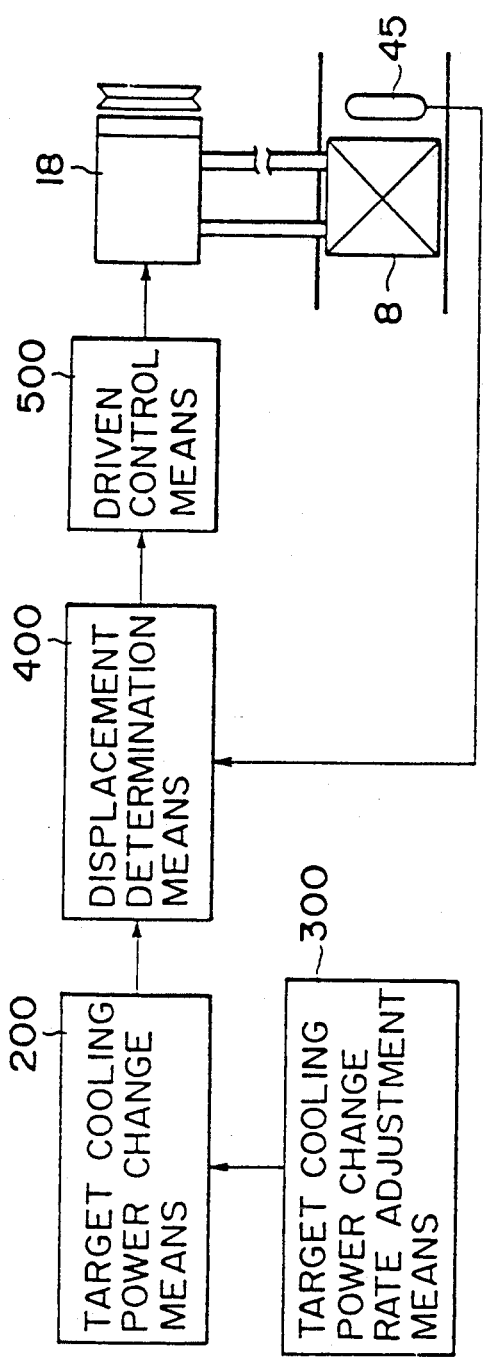
FIG. I
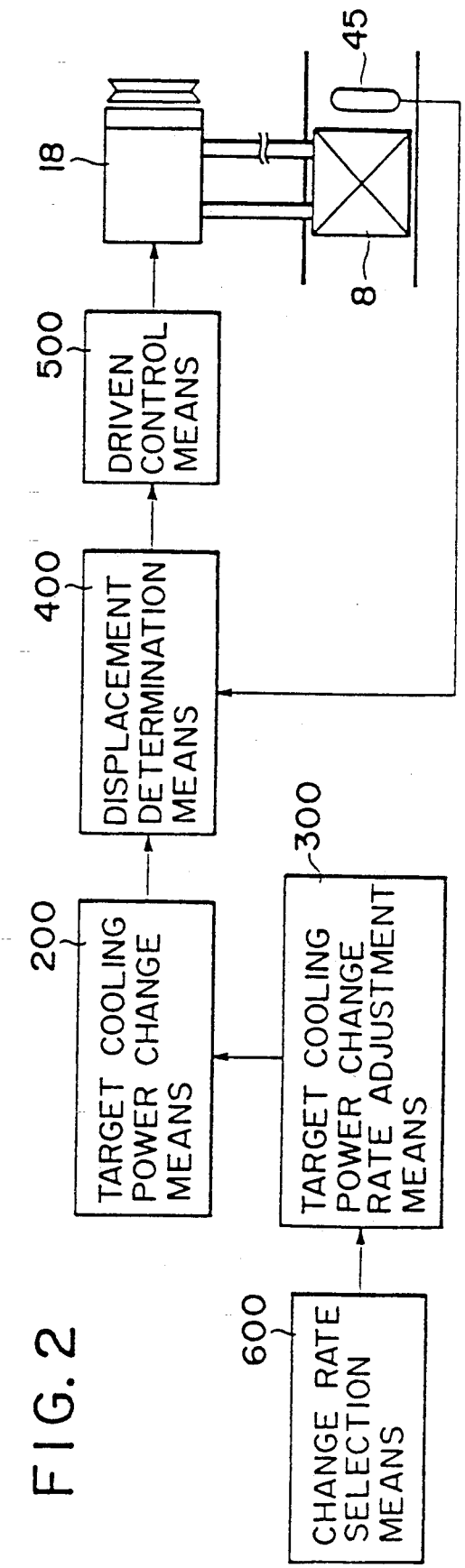
FIG. 2

APPARATUS FOR CONTROLLING COMPRESSOR OF AUTOMOBILE AIR-CONDITIONER

BACKGROUND OF THE INVENTION

1. Field of the Invention

The present invention relates to an apparatus for controlling a compressor used in an automobile air-conditioner.

2. Description of the Prior Art

Japanese Patent Laid-open Publication No. 60-22525 exemplifies an apparatus for controlling the displacement of a variable displacement compressor incorporated in an automobile air-conditioner and driven by an engine of the automobile. The apparatus includes means for setting a target cooling power of a cooler and means for measuring the actual cooling power of the cooler. The target cooling power is determined depending on various conditions such as thermal loads in the vehicle passenger compartment, a temperature set by an occupant, etc. The displacement of the variable displacement compressor is controlled by properly adjusting a displacement adjustment signal until the actual cooling power is in equal to the target cooling power.

According to the known control apparatus, the target cooling power varies with a change thermal load having an influence on the vehicle passenger compartment temperature or with a manual setting of the temperature by the occupant. A change in target cooling power directly varies the displacement of the compressor. Consequently, if the vehicle compartment setting temperature is greatly varied by manual settings of the occupant, the displacement of the compressor changes rapidly as a consequence of a sudden change of the target cooling power. Such a rapid change of the compressor displacement may increase the engine load which will affect the drivability of the automobile or provide an unpleasant feeling due to a sudden change in temperature of the discharged air.

A modified form of the compressor control apparatus is proposed by the present assignee, wherein the operation of the compressor continues even when the cooling power of the evaporator represented in terms of the temperature of the evaporator is below a freezing initiation temperature near 0° C. This is achieved either by setting the target cooling power to an extremely low temperature such as −10° C. to supply a maximum cooling power (cool-down control) when a quick cooling of the vehicle passenger compartment is needed, or by similarly setting the target cooling power to a low temperature to improve the demist performance characteristic (low temperature demist control) when the outside air temperature is low. However, a continuing operation under such a cool-down control and low temperature demist control is likely to cause a freezing of the evaporator which makes it impossible to return to the regular control mode.

SUMMARY OF THE INVENTION

With the foregoing difficulties in view, it is an object of the present invention to provide an apparatus for controlling a variable displacement compressor of an automobile air-conditioner, which apparatus is capable of preventing a sudden change in cooling ,power of an evaporator to thereby maintain the drivability of the automobile and to provide a pleasant air-conditioned feeling in the vehicle passenger compartment even when the setting temperature is greatly varied.

Another object of the present invention is to provide a highly reliable compressor controlling apparatus which is capable of properly selecting the rate of change of the displacement of a compressor depending on the current control condition so as to prevent freezing of the evaporator.

According to a first aspect of the present invention as shown in FIG. 1, there is provided an apparatus for controlling a compressor of an automobile air-conditioner, comprising: a variable displacement compressor 18 capable of varying its displacement according to an external control signal; a mode sensor 45 for detecting the cooling power of an evaporator 8 of the automobile air-conditioner; target cooling power change means 200 for manually or automatically changing a target cooling power for the evaporator 8; target cooling power change rate adjustment means 300 for limiting the rate of change of the target cooling power to a predetermined rate after the target cooling power is changed by the target cooling power change means 200; displacement determination means 400 for determining the displacement of the variable displacement compressor 18 in such a manner as to reduce the deviation of an actual cooling temperature of the evaporator 8 from the target cooling power the evaporator 8; and drive control means 500 for controlling the operation of the variable displacement compressor 18 according to the output from the displacement determination means 400.

According to a second aspect of the present invention as shown in FIG. 2, there is provided an apparatus for controlling a compressor of an automobile air-conditioner, comprising: a variable displacement compressor 18 capable of varying its displacement according to an external control signal; a mode sensor 45 for detecting the cooling power of an evaporator 8 of the automobile air-conditioner; target cooling power change means 200 for manually or automatically changing a target cooling power for the evaporator 8; target cooling power change rate adjustment means 300 for limiting the rate of change of the target cooling power to a predetermined rate after the target cooling power is changed by the target cooling power change means 200; change rate selection means 600 for selecting the target cooling power change rate from a plurality of preset values depending on a desired control condition to which the target cooling power is to be changed; displacement determination means 400 for determining the displacement of the variable displacement compressor 18 in such a manner as to reduce the deviation of an actual cooling temperature of the evaporator from the target cooling power of the evaporator; and drive control means 500 for controlling the operation of the variable displacement compressor 18 according to the output from the displacement determination means 400.

With this construction, when the target cooling power of the evaporator is changed either automatically by a change in thermal load in the vehicle passenger compartment, or manually by an occupant of the vehicle, the target cooling power varies gently at a limited rate until the target cooling power is obtained. The displacement of the compressor changes gently, too, so that a sudden change of the discharged air temperature can be prevented. The change rate of the target cooling power is selectable, so the rate of change of the compressor displacement can be controlled so as to preferentially perform the anti-freezing operation of the evaporator.

The above and other objects features and advantages of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a block diagram showing the general construction of a compressor controlling apparatus according to a first embodiment of the present invention;

FIG. 2 is a block diagram showing the general construction of a compressor controlling apparatus according to a second embodiment of the present invention;

DETAILED DESCRIPTION

The present invention will be described hereinbelow in greater detail with reference to certain preferred embodiments shown in the accompanying drawings.

Figure 3:
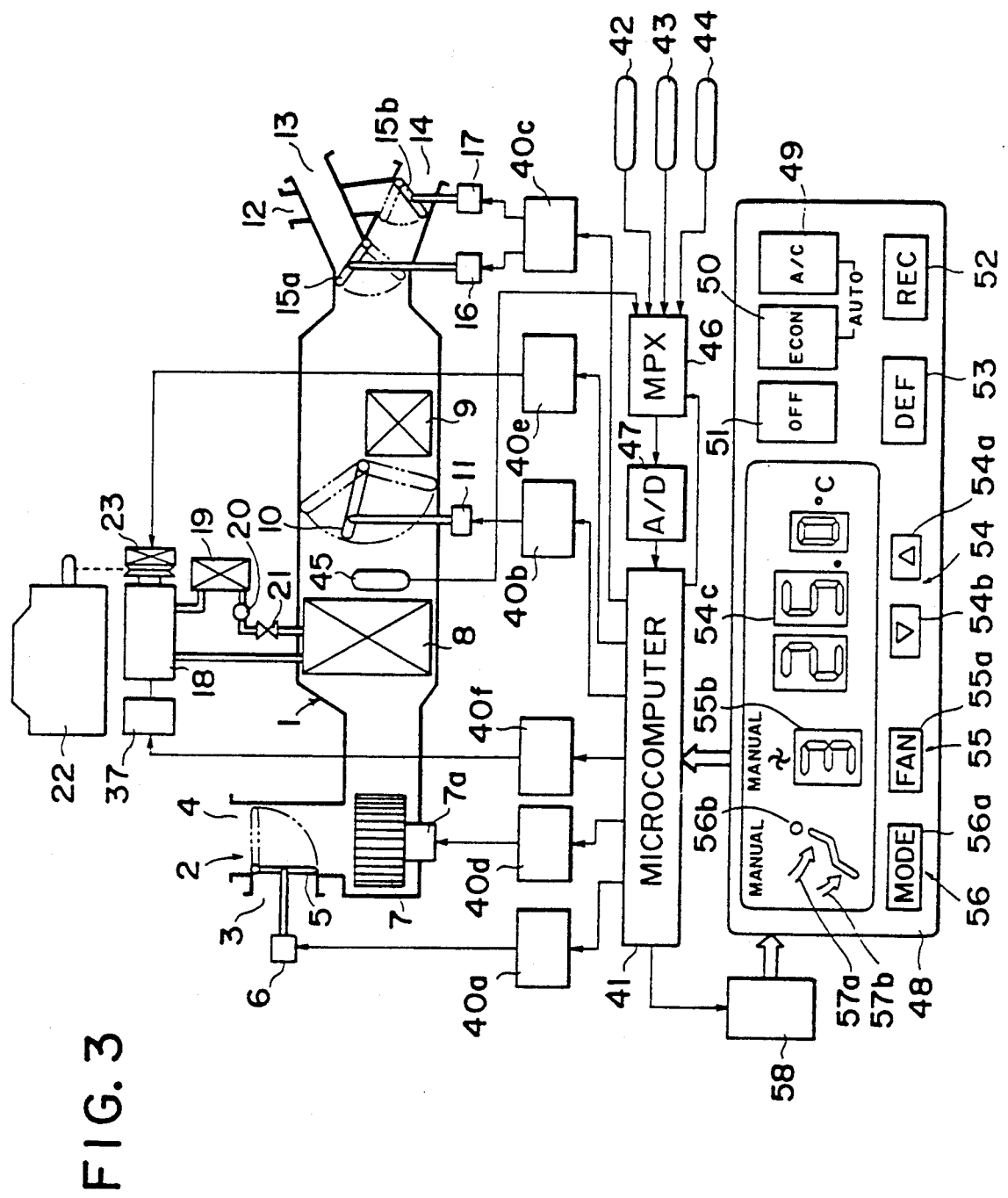
FIG. 3 is a diagrammatical view showing the general construction of an automobile air conditioner in which the compressor controlling apparatus shown in FIGS. 1 and 2 are incorporated.

As shown in FIG. 3, an automobile air-conditioner in which principles of the present invention are embodied includes a main air-flow duct 1 having an intake door selection device 2 disposed at the upstream end of the main airflow duct 1. The intake door selection device 2 includes a selector door 5 disposed at the junction between a recirculated air inlet 3 and an outside air inlet 4 that are provided in bifurcated fashion. The selector door 5 is actuated by an actuator 6 to select the outside air or the recirculated air to be introduced into the main air-flow duct 1.

A blower 7 is disposed in the duct 1 adjacent to the air inlets 3, 4 for forcing the air to flow downstream through the main air-flow duct 1. The duct 7 also includes an evaporator 8 and a heater core g disposed downstream of the blower 7 in the order named. An air-mix door 10 is disposed in front of the heater core 9 and pivotally movable by an actuator 11 so that the ratio of the amount of air flowing directly through the heater core 9 to the amount of air bypassing the heater core 9 is adjusted depending on the opening of the air-mix door 10, thereby controlling the temperature of air blown off from the air-conditioner.

The main air-flow duct 1 has at its downstream end a defroster outlet 12, a vent outlet 13 and a heat outlet 14 that are provided in a branched fashion and all open to a vehicle compartment. Two mode doors 15a, 15b are disposed at the junction between the vent outlet 13 and heat outlet 14 and the junction between the heat outlet 14 and the defroster outlet 12. The mode doors 15a, 15b are actuated by actuators 16, 17, respectively, to set a desired discharge mode of the air-conditioner.

Figure 4:
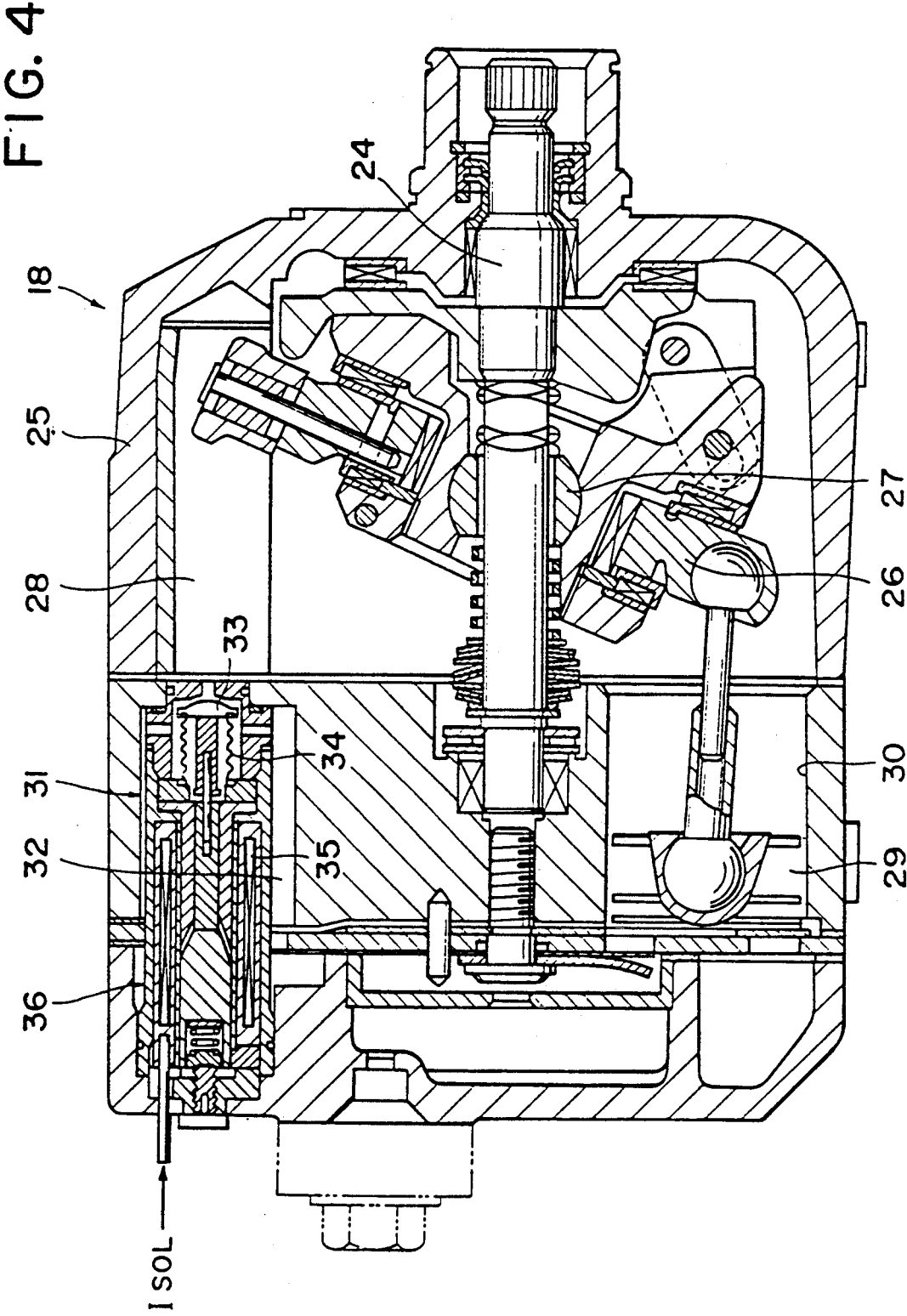
FIG. 4 is a cross-sectional view of a variable displacement compressor used in the automobile air-conditioner.

The evaporator 8 is in fluid communication with a variable displacement compressor 18, a condenser 19, a liquid tank 20 and an expansion valve 21 to jointly constitute a refrigeration cycle or system for cooling air passing around the evaporator 8. The variable displacement compressor 18 is of the swash plate type, for example. The swash plate type variable displacement compressor 18 includes, as shown in FIG. 4, a drive shaft 24 disposed in a compressor body 25 and coupled to an engine 22 (FIG. 3) via an electromagnetic clutch 23 (FIG. 3), and a swash plate 26 mounted on the drive shaft 24 by a hinge ball 27. The swash plate 26 thus mounted on the drive shaft 24 oscillates or swings about the hinge ball 27 within a crank chamber 28 so that at least one piston 29 connected to the swash plate 26 is reciprocated in a cylinder bore 30 in response to the oscillation of the swash plate 26. The variable displacement compressor 18 further has a pressure control valve 31 facing the crank chamber 28. The pressure control valve 31 includes a movable valve element 33 movable for adjusting the degree of communication between the crank chamber 28 and an intake chamber 32 communicating the intake side of the compressor 18, a pressure responsive member 34 responsive to the pressure in the intake chamber 32 for moving the valve element 3, and a solenoid 36 for displacing the valve element 33 according to the magnitude of an exiting current $I_{SOL}$ supplied to an electromagnetic coil 35. With the pressure control valve 31 thus constructed, the amount the blowby gas (leaking between the piston 29 and the cylinder bore 30) returned from the crank chamber 28 to the intake side can be adjusted by externally controlling the exciting current $I_{SOL}$. The pressure control valve 31 constitutes a main part of a displacement adjustment device 37 (FIG. 3) for changing the displacement of the variable displacement compressor 18. When the exciting current $I_{SOL}$ flowing through the electromagnetic coil 35 is increased to enhance the magnetic force of the solenoid 36, the valve element 33 is displaced in a direction to reduce or limit the communication between the crack chamber 28 and the intake chamber 32, thereby lowering the amount of return of the blowby gas from the crank chamber 28 and the intake chamber 32. As a consequence, the : pressure in the crank chamber 28 increases, as does the force or pressure acting on the back of the piston 29. Thus, the swash plate 26 is pivoted about the pivot ball 27 in a direction to reduce it angle of oscillation, thereby reducing the stroke of the piston 29. The displacement of the compressor 18 is thus lowered.

The displacement adjustment device 37 is not limited to the pressure control valve 31 which is constructed to adjust the return of the blowby gas to the intake side as described above. It may be constructed to change the number of cylinders in the compressor, or the pulley ratio of a belt transmission mechanism coupling the compressor and the engine 22, In the case of a variable displacement compressor of the rotary vane type, the displacement adjustment device is constructed to change the number of vanes.

The actuators 6, 11, 16, 17, a motor 7a of the blower 7, the electromagnetic clutch 23 and the displacement adjustment device 37 of the variable displacement compressor 18 are controlled by output signals supplied thereto from a microcomputer 41 through corresponding drive circuits 40a–40f, as shown in FIG. 3.

The microcomputer 41 is of a conventional type known per se and includes a central processing unit (CPU), a read only memory (ROM), a random access memory (RAM), an input/output port (I/O), a clock pulse generator having a quartz oscillator for generating a reference pulse, etc. (none of them shown). The microcomputer 41 is supplied with an output signal $T_R$ from a vehicle compartment temperature sensor 42 for detecting the temperature in the vehicle passenger compartment, an output signal $T_A$ from an outside air temperature sensor 43 for detecting the outside temperature, an output signal $Q_S$ from a sunlit portion temperature sensor 44 for detecting the radiation energy of the sun in the form of the temperature of a portion illuminated by the sun, and an output signal $T_{INT}$ from a mode sensor 45 disposed on or downstream of the evaporator 8 for detecting, as the power of the evaporator 8, the temperature of the evaporator 8 or the temperature of air passed through the evaporator 8. Before being inputted to the microcomputer 41, these output signals are selected by a multiplexer (MPX) 46 and then digitized by an A/D converter 47.

The microcomputer 41 is also supplied with output signals from an instrument panel 48. The instrument panel 48 is provided with an A/C switch 49 for starting the variable displacement compressor with all components of the air-conditioner set in an automatically controlled condition, an ECON switch 50 for economically controlling the variable displacement compressor 18 in the auto mode, an OFF switch 51 for instructing the stop mode, a REC switch 52 for selecting the intake mode between the recirculating air intake mode and the outside air intake mode, a DEF switch 53 for setting the discharge mode to the defrost mode, a temperature setter 54 for setting the temperature inside the vehicle passenger compartment, a blower power setter 55 for setting the power of the blower 7, and a discharge mode setter 56 for setting the discharge mode other than the defrost mode.

The temperature setter 54 is composed of up and down switches 54a, 54b and an indicator or display 54c for indicating a setting temperature $T_D$. The setting temperature $T_D$ indicated on the display 54c can be varied within a predetermined range by properly actuating the up and down switches 54a, 54b. The blower power setter 55 includes a FAN switch 55a for selecting the level of rotation of the blower 7 and a level indicator 55b for indicating the current rotation level of the blower 7. By manually actuating the FAN switch 55a repeatedly, the power of the blower 7 is shifted in sequence between the stop mode (level 0), LOW mode (level 1), MID mode (level 2) and HI mode (level 3). In this instance, a word "MANUAL" is display above the indicator 55b. The mode setter 56 includes a MODE switch 56a for selectively setting the discharge mode between the vent mode, the bi-level mode and the heat mode, in sequence, and a graphic indicator 56b for indicating the current discharge mode by graphic image. When the MODE switch 56a is actuated, the direction of airflow in the selected mode is indicated on the graphic indicator 56b by at least one arrow 57a, 57b. In this instance, a word "MANUAL" is indicated above the graphic indicator 56b. The indicators 54c, 55b, 56b and the lighting are controlled by the microcomputer 41 via a display circuit 58.

Figure 5:
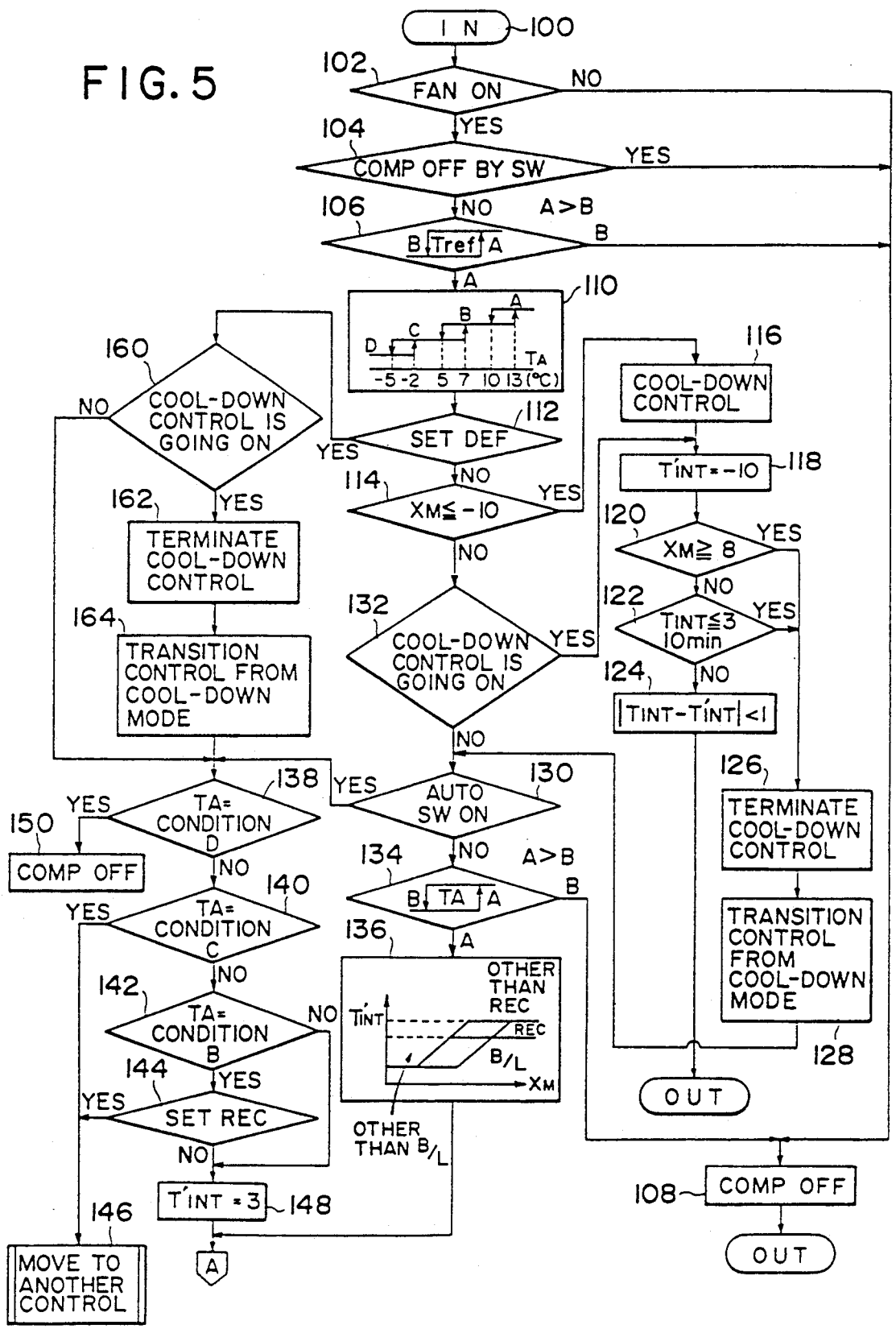
FIG. 5 is a flowchart showing a first part of a control routine achieved by a microcomputer for controlling the variable displacement compressor.
Figure 6:
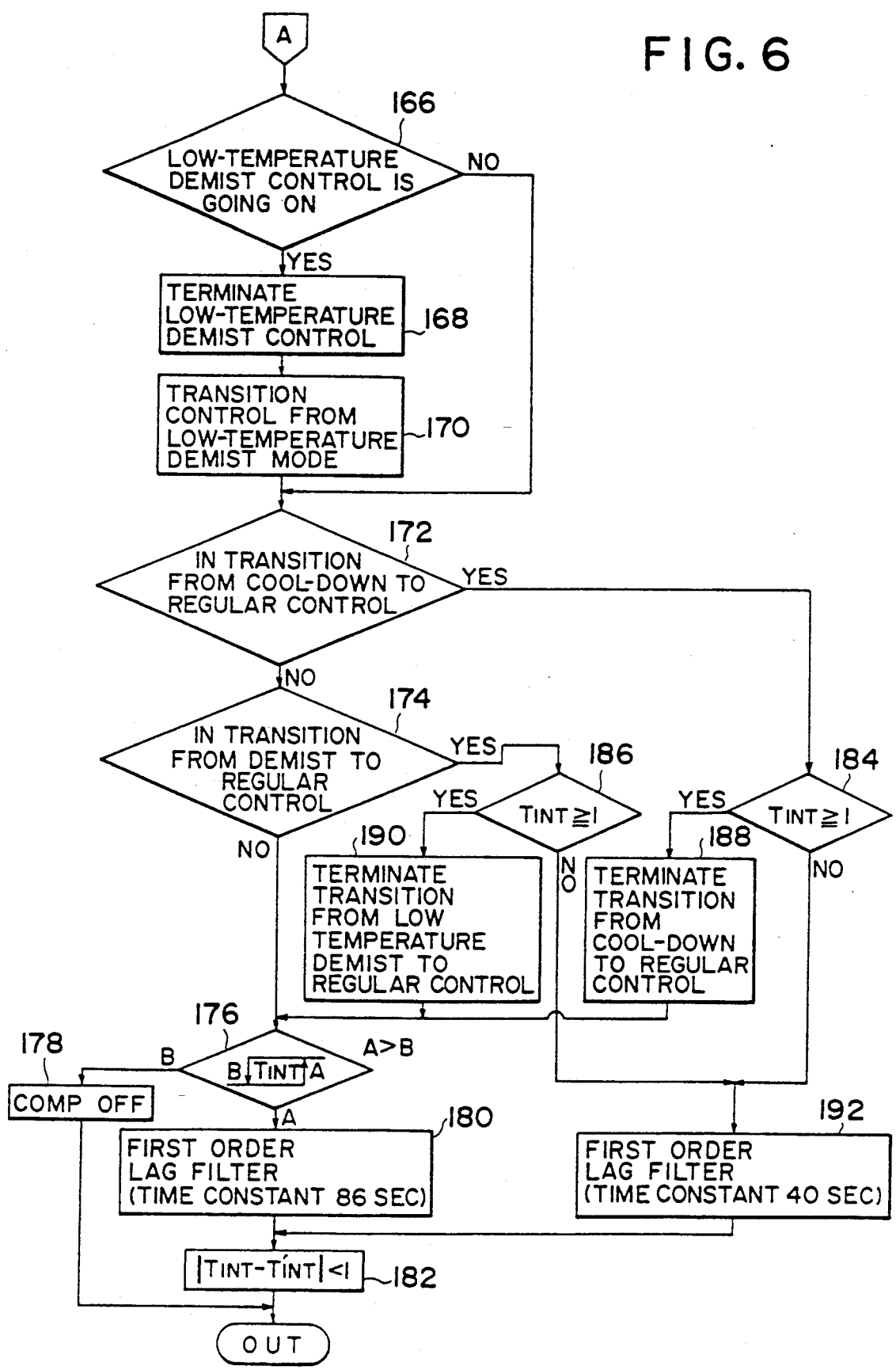
FIG. 6 is a flowchart showing a second part of the control routine shown in FIG. 5.

FIG. 5 and 6 are is a flowchart showing a control program achieved by the microcomputer 41 for controlling the variable displacement compressor 18. The microcomputer 41 starts the program from a step 100. If steps 102, 104 and 106 judge respectively that the blower 7 is stopped, the OFF switch or the ECON switch is actuated to send an instruction to stop the variable displacement compressor 18, or the refrigerant temperature $T_{REF}$ is lower than a predetermined temperature, the control program advances to a step 108 to stop the variable displacement compressor 18 for preventing freezing of the compressor. If each of the steps 102, 104, 106 judges to the contrary, the control program proceeds to a step 110 which determines the condition of the outside air temperature among preset values (A, B, C or D) based on the outside air temperature $T_A$ (for example, $T_A > 10$=condition A, $5 < T_A 13$=condition B, $-5 < T_A < 7$=condition C, and $-2 > T_A$=condition D). The next step 112 judges whether the DEF switch 53 is depressed to set the discharge mode to the defrost mode. If the discharge mode is set to one other than the defrost mode, then the control program advances to a step 114. The step 114 judges whether the necessary discharge temperature XM calculated by the expression (1) before the control program routine is lower than $-10°$ C.

$$X_M = A \cdot T_D + B \sim T_R + C \cdot T_A + D \cdot Q_S + E \qquad (1)$$

where A, B, C, D are gains of $T_D$, $T_R$, $T_A$ and $Q_S$, respectively, and E is a correction term.

If $X_M \leq -10$ in this step 114, this means that a rapid cooling of the blow-off air is needed. Accordingly, the control program goes on to a step 116 to set a flag for executing the cool-down control. Thereafter, the control program advances to a step 118 to set the target cooling power $T'_{INT}$ of the evaporator 8° to $-10°$ C. The cool-down control continues until the necessary discharge temperature $X_M$ exceeds 8° C. (step 120), or the actual cooling power of the evaporator 8 falls below 3° C. for more than 10 minutes (step 122). In the cool-down control, the displacement TINT of the variable displacement compressor 18 is controlled in a step 124 such that the deviation of $T_{INT}$ from $T'_{INT}$ is less than 1° C. If the condition of the step 120 or the step 122 is satisfied, the cool-down control is terminated in step 126. Then, a flag for a transition control is set in a step 128 to let the program return to the regular control and, thereafter, the control program proceeds to a step 130. If $X_M > -10$ in the step 114, the control program goes on to a step 132 to determine whether the cool-down control is going on now. If yes, the control program proceeds to the step 118. If the cooling-down control is terminated, then the control program goes on to the step 130.

The step 130 makes a judgment as to whether the A/C switch 43 is depressed or not. If no, the control program advances to a step 134 to further judge whether the outside temperature is higher than the predetermined temperature. If judgment in step 134 is no, the control program moves to the step 108 to stop the variable displacement compressor 18. If the outside temperature is judged as exceeding the predetermined temperature in the step 134, then the control program advances to a step 136. The step 136 determines the target cooling power $T'_{INT}$ from a predetermined characteristic pattern based on $X_M$. If the A/C switch 49 is depressed in the step 130, then steps 138, 140, 142, 144 judge in succession whether the outside air temperature $T_A$ is in either condition A–D. In case of the condition D, the control program goes on to a step 150 to stop the variable displacement compressor 18. If the outside air temperature is in the condition C, or if the outside air temperature is in the condition B in the 142 and then the intake mode is set to the recirculating air intake mode (REC) in a step 144, the control program goes on to a step 146 to proceed with another control operation needed for the demist operation. In a condition other A than specified above, the target cooling power $T'_{INT}$ is set to 3° C. in a step 148.

If the discharge mode is set to the defrost mode in the step 112, the control program moves to a step 160 to judge whether the cool-down control is going on now. If yes, the cooling-down control is terminated in a step 162 and thereafter a flag needed for a transition control from the cool-down control to the regular control is set in a step 164. Then the control program advances to the step 138 stated above. If the cool-down control is terminated in the step 160, the control program jumps to the step 138 from which the operation continues in the manner as described above.

After the target cooling power $T'_{INT}$ is determined in the step 136 or the step 148, the control program advances to a step 166 to determine whether the low temperature demist control is now going on or not. If yes, this low temperature demist control is terminated in a step 168 and then a flag needed to a transition control to the regular control is set in a step 170. Thereafter, the control program proceeds to a step 172. If the low temperature demist control is terminated in the step 166, the control directly moves to the step 172. The step 172 judges whether the transition from the cool-down control to the regular control is now going on. In the next following step 174, a further judgment is achieved to determine whether the transition from the demist control to the regular control is now going on. If the transition control is not going on and the regular control is being achieved to the contrary, the control program advances to a series of following steps beginning from a step 176. In the step 176 it is judged whether the actual cooling power $T_{INT}$ of the evaporator 8 is greater than a predetermined temperature which is high enough to prevent freezing. If no, the control moves to a step 178 to stop the operation of the variable displacement compressor 18. If the actual cooling power $T_{INT}$ exceeds the predetermined temperature, the control proceeds to a step 180 to vary the target cooling power $T'_{INT}$ gradually toward the value determined in the step 136 or 148 with the agency of a first order lag filter having a time constant of 86 seconds. In the next following step 182, the displacement of the variable displacement compressor 18 is controlled until $T_{INT}$ approaches $T'_{INT}$.

If the transition from the cool-down to the regular control still continues in the step 172, the control program moves to a step 184 to make a further judgment as to whether the actual cooling power $T_{INT}$ of the evaporator 8 is greater than 3° C. or not. In the case where the judgment in the step 174 indicates that the transition from the low temperature demist control to the regular control still continues, the control program moves to a step 186 to judge whether $T_{INT}$ is higher than 1° C. or not. The reference temperatures set in the steps 184, 186 indicate that the regular control can be achieved without trouble when the cooling power of the evaporator exceed these reference temperatures. If $T_{INT}$ exceeds the reference temperature set in the step 184 or 186, the control program goes on to a steps 188 or 190 to terminate the transition control and thereafter advances to the step 176 onward. If $T_{INT}$ is lower than the reference temperature set in the step 184 or 186, a step 192 varies $T'_{INT}$ using a first order lag filter whose time constant is smaller (40 seconds for example) than the time constant of the first order lag filter used in the step 180. The displacement of the variable displacement compressor 18 is controlled until $T_{INT}$ approaches to $T'_{INT}$ in a step 182.

Consequently, in the regular control mode, when the target cooling power $T'_{INT}$ of the evaporator 8 is changed either automatically by a change in thermal load in the vehicle passenger compartment, or manually by an occupant of the vehicle, the target cooling power $T'_{INT}$ varies gently, thereby preventing the occurrence of a sudden change of the discharged air temperature which would otherwise be caused by a rapid change in the actual cooling power $T_{INT}$ of the evaporator 8. In the course of the transition from the cool-down control or the low temperature demist control to the regular control, the cooling power of the evaporator is lowered as quickly as possible, in preferential to the control needed for preventing a sudden change of the discharged air temperature, until the temperature of the evaporator 8 rises to a value enabling the regular control. The freezing of the evaporator can be prevented and hence the regular control is achieved smoothly.

As described above, the target cooling power change rate is limited to a predetermined speed so as to prevent a sudden change or fluctuation of the displacement of the variable displacement compressor. As a result, the drivability is never deteriorated even when the engine load changes suddenly. The cooling power of the evaporator changes gently so that a pleasant temperature regulation in the vehicle passenger compartment can be achieved. The rate of change of the target cooling power is selectable. Accordingly, during the transition from the cool-down control or the demist control in which the evaporator operates at a temperature below the freezing temperature, a higher change rate is selected to preferentially perform the anti-freezing operation. Thus the automobile air-conditioner having the inventive compressor control apparatus is highly reliable in operation.

Obviously, various modifications and variations of the present invention are possible in the light of the above teaching. It is therefore to be understood that within the scope of the appended claims the present invention may be practiced otherwise than as specifically described.

What is claimed is:

1. An apparatus for controlling a compressor of an automobile air-conditioner, comprising:
    (a) a variable displacement compressor capable of varying its displacement according to an external control signal;
    (b) a mode sensor for detecting the cooling power of an evaporator of the automobile air-conditioner;
    (c) target cooling power change means for manually or automatically changing a target cooling power for the evaporator;
    (d) target cooling power change rate adjustment means for limiting the rate of change of the target cooling power to a predetermined rate after the target cooling power is changed by said target cooling power change means;
    (e) displacement determination means for determining the displacement of said variable displacement compressor in such a manner as to reduce the deviation of an actual cooling temperature of said evaporator from said target cooling power of said evaporator; and
    (f) drive control means for controlling the operation of said variable displacement compressor according to the output from said displacement determination means.

2. An apparatus for controlling a compressor of an automobile air-conditioner, comprising:
 (a) a variable displacement compressor capable of varying its displacement according to an external control signal;
 (b) a mode sensor for detecting the cooling power of an evaporator of the automobile air-conditioner;
 (c) target cooling power change means for manually or automatically changing a target cooling power for the evaporator;
 (d) target cooling power change rate adjustment means for limiting the rate of change of the target cooling power to a predetermined rate after the target cooling power is changed by said target cooling power change means;
 (e) change rate selection means for selecting the target cooling power change rate from a plurality of preset values depending on a desired control condition to which the target cooling power is to be changed;
 (f) displacement determination means for determining the displacement of said variable displacement compressor in such a manner as to reduce the deviation of an actual cooling temperature of said evaporator from said target cooling power of said evaporator; and
 (g) drive control means for controlling the operation of said variable displacement compressor according to the output from said displacement determination means.

* * * * *